(12) United States Patent
Kasuga et al.

(10) Patent No.: US 6,658,178 B2
(45) Date of Patent: Dec. 2, 2003

(54) OPTICAL COMMUNICATIONS EQUIPMENT

(75) Inventors: Masao Kasuga, Chiba (JP); Akihiro Iino, Chiba (JP); Tomohiro Shimada, Chiba (JP)

(73) Assignee: Seiko Instruments Inc., Chiba (JP)

( * ) Notice: Subject to any disclaimer, the term of this patent is extended or adjusted under 35 U.S.C. 154(b) by 387 days.

(21) Appl. No.: 09/840,415

(22) Filed: Apr. 23, 2001

(65) Prior Publication Data

US 2001/0036333 A1 Nov. 1, 2001

(51) Int. Cl.[7] .................................................. G02B 6/42
(52) U.S. Cl. ..................... 385/19; 385/140; 310/323.01
(58) Field of Search ................. 385/17–19, 24, 385/131–132, 140; 310/311, 323.01, 328

(56) References Cited

U.S. PATENT DOCUMENTS

| | | | | | |
|---|---|---|---|---|---|
| 5,268,974 A | * | 12/1993 | Hikita et al. | .................. | 385/19 |
| 6,078,438 A | * | 6/2000 | Shibata et al. | .............. | 359/819 |
| 6,084,335 A | * | 7/2000 | Tamai | ................... | 310/323.12 |
| 6,522,388 B1 | * | 2/2003 | Takahashi et al. | ............ | 355/53 |
| 6,545,421 B1 | * | 4/2003 | Takeuchi et al. | ......... | 315/169.1 |

* cited by examiner

Primary Examiner—Khiem Nguyen
(74) Attorney, Agent, or Firm—Adams & Wilks

(57) ABSTRACT

A highly reliable optical communications equipment is offered, which can control light more accurately than heretofore (i.e., less restrictions are imposed on the amount of attenuation and on the resolution) and which is equipped with a latching function. The optical communications equipment includes a piezoelectric actuator, a moving body moved by the piezoelectric actuator as a drive source, a multi-coating filter for controlling light that is a signal medium by movement of the moving body, a drive circuit for controlling the position of the multi-coating filter via the actuator, and a control circuit. The piezoelectric actuator uses bending vibrations produced in a piezoelectric vibrating body as a power source. If the moving body is not moved for a given time, the control circuit sends a function keeping signal to drive the actuator to such an extent that the moving body does not move. Thus, the function of the actuator is maintained.

13 Claims, 6 Drawing Sheets

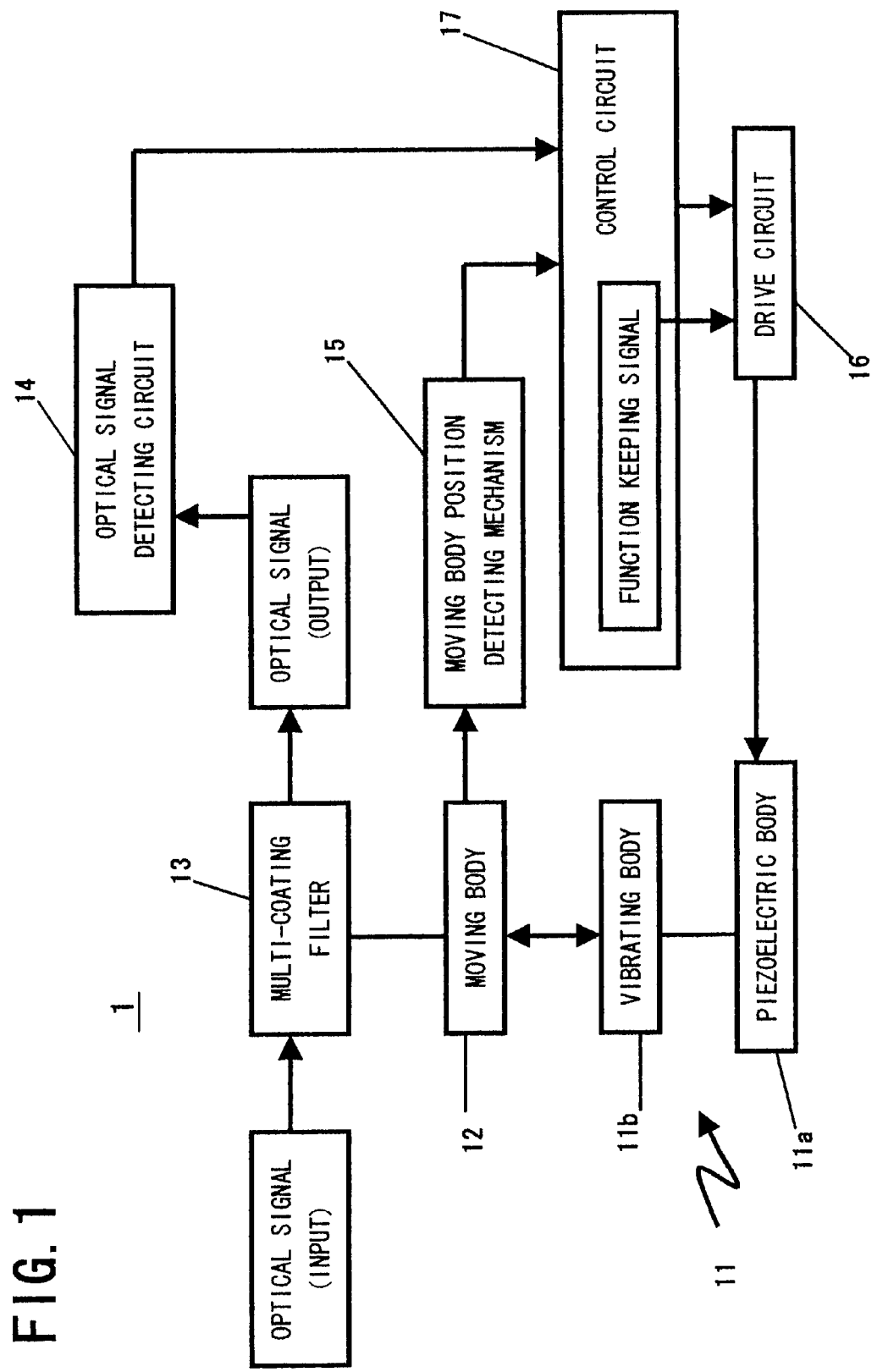

OPTICAL COMMUNICATIONS EQUIPMENT

BACKGROUND OF THE INVENTION

1. Field of the Invention

The present invention relates to an optical communications equipment used, for example, for high-density, optical frequency-multiplexed, optical networks.

2. Description of the Related Art

In recent years, Internet communications have become widespread at an amazing rate. With this trend, the communications transmission method is shifting to a method using optical fibers. Furthermore, in order to increase the transmission capacity further, WDM (Wavelength Division Multiplexing) utilizing optical multiplexing is being adopted. For this purpose, optical control communications modules for combining, splitting, switching, attenuating, and otherwise processing different wavelengths of optical signals are indispensable.

In some optical control communications modules, an optical control member such as a filter is made to move a very small distance, for controlling light. Other optical control communications modules make use of AWGs (arrayed-waveguide gratings) using optical waveguides.

A drive source is essential for the former type. Conventional optical communications modules have used electromagnetic motors or electromagnetic actuators such as stepping motors and servomotors.

Where a stepping motor is used as a drive source for an optical communications module, it is difficult to accurately place the optical control member in position and so limitations are placed on the resolution. Where a servomotor is used, it needs to be energized whenever the optical control member is placed in position. Hence, it is difficult to realize a latching structure.

Where an AWG (arrayed-waveguide grating) is employed, limitations are imposed on the amount of attenuation and on the resolution.

SUMMARY OF THE INVENTION

It is an object of the present invention to provide a highly reliable, optical communications equipment which controls light more accurately (i.e., less limitations are imposed on the amount of attenuation and on the resolution) and which has a latching function.

This object is achieved in accordance with the teachings of the present invention by an optical communications equipment comprising: a piezoelectric actuator using a deformation motion produced in a piezoelectric vibrating body as a power source; a moving body moved by the piezoelectric actuator as a drive source; an optical control unit for controlling light that is a signal medium as the moving body moves; and a drive control circuit for controlling the optical control unit via the piezoelectric actuator. If the moving body is not moved for a given time, the drive control circuit can send a function keeping signal to drive the piezoelectric actuator to such an extent that the moving body does not move or that transmission of the optical signal is not affected.

BRIEF DESCRIPTION OF THE DRAWINGS

FIG. 1 is a block diagram of an optical communications equipment in accordance with a first embodiment of the present invention;

DESCRIPTION OF THE PREFERRED EMBODIMENTS

Figure 2A:
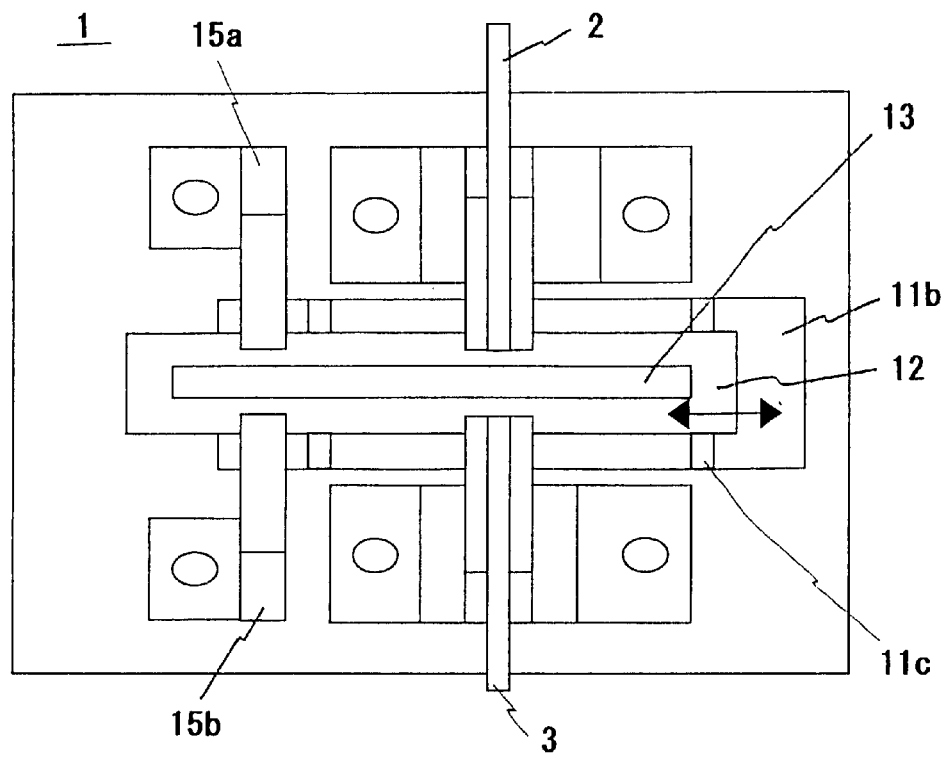
FIG. 2A is a schematic plane view of the optical communications equipment shown in FIG. 1.

Embodiments of the present invention will be described in detail with reference to the drawings.

First Embodiment

The structure is first described.

As shown in FIGS. 1 and 2, an optical switch 1 (optical communications equipment) is mainly constructed of a piezoelectric actuator 11, a moving body 12 moved by a drive source that is the piezoelectric actuator 11, a well-known multi-coating filter 13 mounted to the moving body 12, a well-known optical signal detecting circuit 14 (omitted in FIG. 2) for detecting the wavelength, strength, and presence or absence of light (hereinafter referred to as the light signal) controlled by the multi-coating filter 13, a moving body position detecting mechanism 15 for detecting the position of the moving body 12, a well-known drive circuit 16 (omitted in FIG. 2) for driving a piezoelectric body 11a, and a control circuit 17 (omitted in FIG. 2) for controlling the drive circuit 16 by analyzing the signal from the optical signal detecting circuit 14 and the signal from the moving body position detecting mechanism 15. The multi-coating filter 13 is located between an output end of an optical fiber 2 for outputting and an input end of an optical fiber 3 for inputting.

The drive circuit 16 can be self-excited as often used in piezoelectric buzzers and ultrasonic motors, taking account of the environment correspondence such as a temperature range that the optical communications equipment is required to have.

That is, in the optical switch 1, the multi-coating filter 13 is driven by the piezoelectric actuator 11, thus turning on and off the optical signal sent from the optical fiber 2 to the optical fiber 3.

The piezoelectric actuator 11 is a translational piezoelectric actuator having the piezoelectric body 11a and a vibrating body 11b. The signal from the drive circuit 16 induces an expanding and contracting motion that is a deformation motion generated on the top surface of the piezoelectric body 11a. The expanding and contracting motion is amplified by the vibrating body 11b. This vibration is delivered as an output drive force from a protrusion 11c on the vibrating body 11b.

Figure 2B:
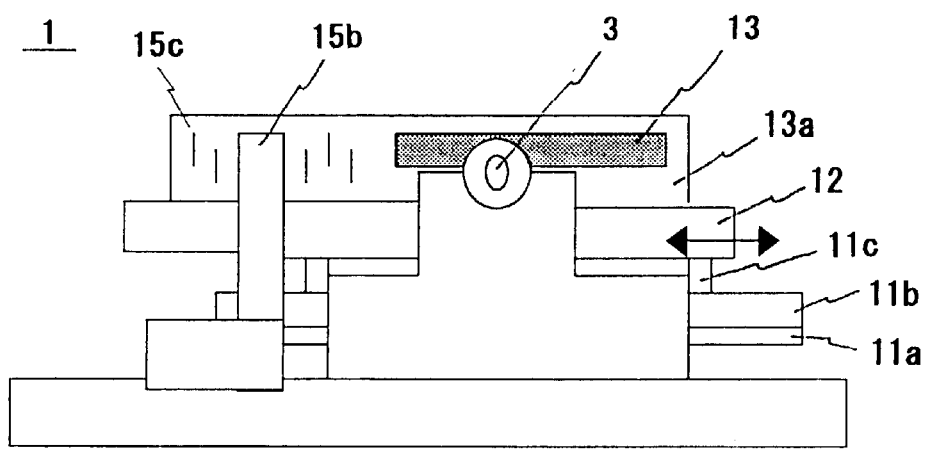
FIG. 2B is a schematic side elevation of the optical communications equipment shown in FIG. 1.

The moving body 12 is a rectangular parallelepiped and placed on the output protrusion 11c of the vibrating body 11b as shown in FIGS. 2A and 2B.

A glass substrate 13a is mounted on the top of the moving body 12. The glass substrate 13a holds the multi-coating filter 13 while it is exposed from the opposite side surfaces. Also, the glass substrate 13a holds a slit 15c that is a part of the moving body detecting mechanism 15 parallel to the multi-coating filter 13 such that the slit 15c is exposed to the multi-coating filter 13. The multi-coating filter 13 and the slit 15c are inter-correlated in position.

As shown in FIGS. 2A and 2B, the moving body position detecting mechanism 15 has the slit 15c located between a light-emitting device 15a and a light-receiving device 15b. Light from the light-emitting device 15a is passed through the slit 15c and converted in to a pulsed signal by the light-receiving device 15b. The pulsed signal is sent to the control circuit 17.

The control circuit 17 analyzes information contained in the signal from the optical signal detecting circuit 14. In addition, the control circuit 17 recognizes the position of the multi-coating filter 13 from the signal from the moving body position detecting mechanism 15. If necessary, the control circuit 17 controls the drive circuit 16, thus controlling the drive of the piezoelectric actuator 11. The control circuit 17 modifies the position of the multi-coating filter 13 to turn on and off the optical signal produced from the optical fiber 2.

When the multi-coating filter 13 is not moved for a given time, the control circuit 17 produces a function keeping signal to the drive circuit 16 to prevent the moving body 12 from being stuck to the vibrating body 11b. This causes the drive circuit 16 to produce a drive signal in such a range to the piezoelectric actuator 11 that the moving body 12 is not moved or that the transmission of the optical signal is not affected.

In the present embodiment, the piezoelectric actuator 11 is used as a drive source. Therefore, the multi-coating filter 13 can be placed in position more accurately than where an electromagnetic motor or the like is used. Consequently, if the optical fibers within the communications equipment are made more complex, and if miniaturization of the multi-coating filter 13 is required, the multi-coating filter 13 can be placed in position at an accuracy complying with the requirement.

The piezoelectric actuator 11 is an actuator driven by expanding and contracting vibrations as a power source. If the input of the drive signal is stopped, the moving body 12 does not return to the origin. Accordingly, the moving body 12 and the multi-coating filter 13 are driven by a latching mechanism.

Additionally, the piezoelectric actuator 11 is driven periodically by the function keeping signal. Therefore, if the multi-coating filter 13 is not moved for a long time, it is assured that the piezoelectric actuator 11 can be driven reliably.

The optical switch 1 can be made act as a wavelength-variable optical filter for passing only a desired wavelength of light or as an optical attenuator for varying the intensity of light, by varying the characteristics of the multi-coating filter 13.

Second Embodiment

Figure 3A:
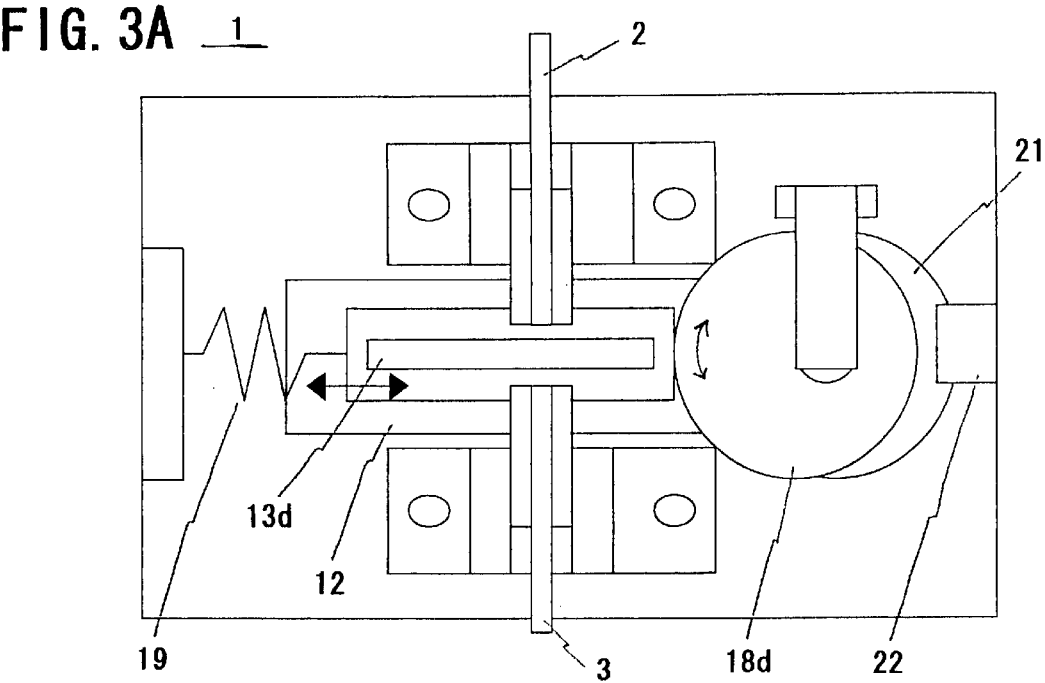
FIG. 3A is a schematic plane view of an optical communications equipment in accordance with a second embodiment of the invention.
Figure 3B:
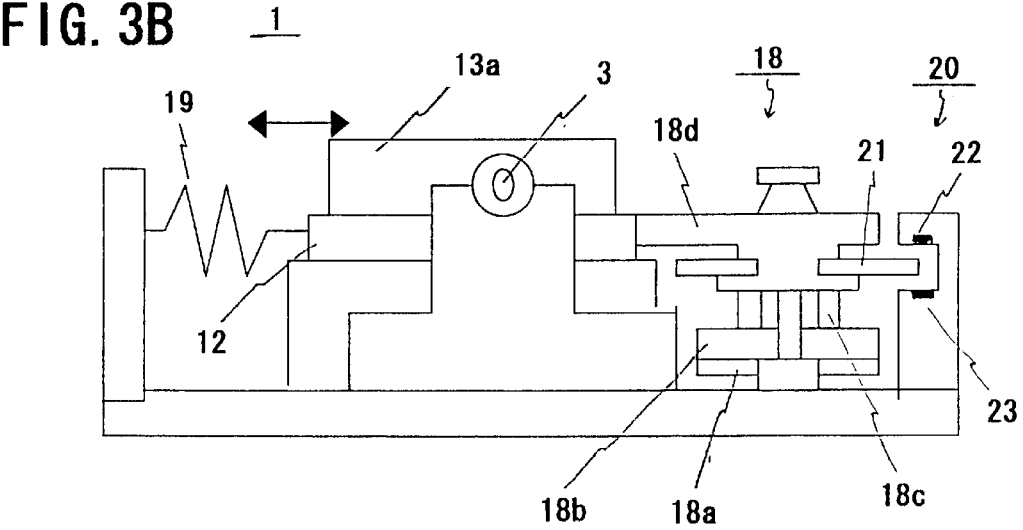
FIG. 3B is a schematic side elevation of the optical communications equipment shown in FIG. 3A.

As shown in FIG. 3, the present embodiment is similar to the first embodiment described already, except that an ultrasonic motor 18 as a rotary piezoelectric actuator and a biasing spring 19 are used in the optical switch 1 instead of the piezoelectric actuator 11 and that an optical encoder 20 is used instead of the moving body position detecting mechanism 15.

The ultrasonic motor 18 has a piezoelectric body 18a on which a vibrating body 18b is mounted. An eccentric rotor 18d is rotatably mounted to an output protrusion 18c on the top surface of the vibrating body 18b. The ultrasonic motor 18 is driven by an expanding and contracting motion of the piezoelectric body 18a as a power source. One end surface of the eccentric rotor 18d is in abutment with one end surface of the moving body 12.

The biasing spring 19 is in abutment with the other end surface of the moving body 12 to bias the moving body 12 toward the eccentric rotor 18d. The moving body 12 is provided with a glass substrate 13a holding the multi-coating filter on its top portion in the same way as in the first embodiment.

The optical encoder 20 is a well-known encoder comprising a slit 21 formed coaxially with the eccentric rotor 18d, a light-emitting device 22, and a light-receiving device 23. These light-emitting device 22 and the light-receiving device 23 are located on the opposite sides of the slit 21. The encoder 20 detects the amount of rotation of the ultrasonic motor 18 and outputs it to the control circuit 17.

In the present embodiment, if the eccentric rotor 18d is rotated in one direction by the ultrasonic motor 18, the moving body 12 is pushed against the end surface of the eccentric rotor 18d and moves to the left as viewed in FIG. 3 by overcoming the biasing force of the biasing spring 19. Then, if the ultrasonic motor 18 is rotated in the reverse direction, the eccentric rotor 18d is also rotated in the reverse direction. As a result, the moving body 12 is no longer pushed. Then, the moving body 12 is moved to the right as viewed in FIG. 3 by the biasing force of the biasing spring 19.

Accordingly, the present embodiment yields advantages similar to those produced by the first embodiment. Furthermore, the optical switch 1 is made act as a wavelength-variable optical filter for passing only a desired wavelength of light or as an optical attenuator for varying the intensity of light, by varying the characteristics of the multi-coating filter on the glass substrate 13a.

Third Embodiment

Figure 4:
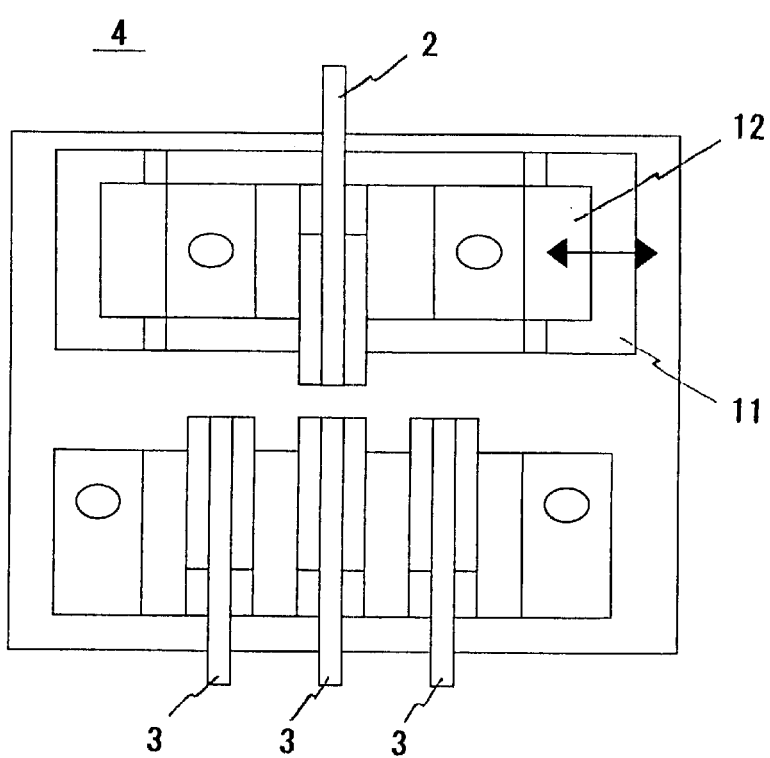
FIG. 4 is a schematic plane view of an optical communications equipment in accordance with a third embodiment of the present invention.

As shown in FIG. 4 that is a partially cutaway plane view, an optical switch 4 (optical communications equipment) in accordance with the present embodiment is similar in structure with the optical switch 1 described previously, except that the optical fiber 2 is fixedly mounted on the moving body 12 instead of the multi-coating filter 13 and that plural output optical fibers 3 are arrayed in parallel along the direction of movement of the moving body 12.

In the optical switch 4, the piezoelectric actuator 11 is driven to move the moving body 12 forward or rearward to switch that of the optical fibers 3 which receives the optical output signal from the optical fiber 2. That is, the optical switch 4 is equipped with an optical switch having the optical fiber 2 as an optical control unit.

Therefore, the optical switch 4 permits the optical fiber 2 to be placed in position more accurately. Consequently, if the optical fibers 3 are placed at a higher density, the destination of the optical signal can be reliably switched. Hence, the optical switch is reduced in size.

Furthermore, the optical fiber 2 can be driven by a latching mechanism similarly to the optical switch 1. In addition, if the optical fiber 2 is not moved for a long time, the piezoelectric actuator 11 can be driven reliably at all times.

Fourth Embodiment

Figure 5:
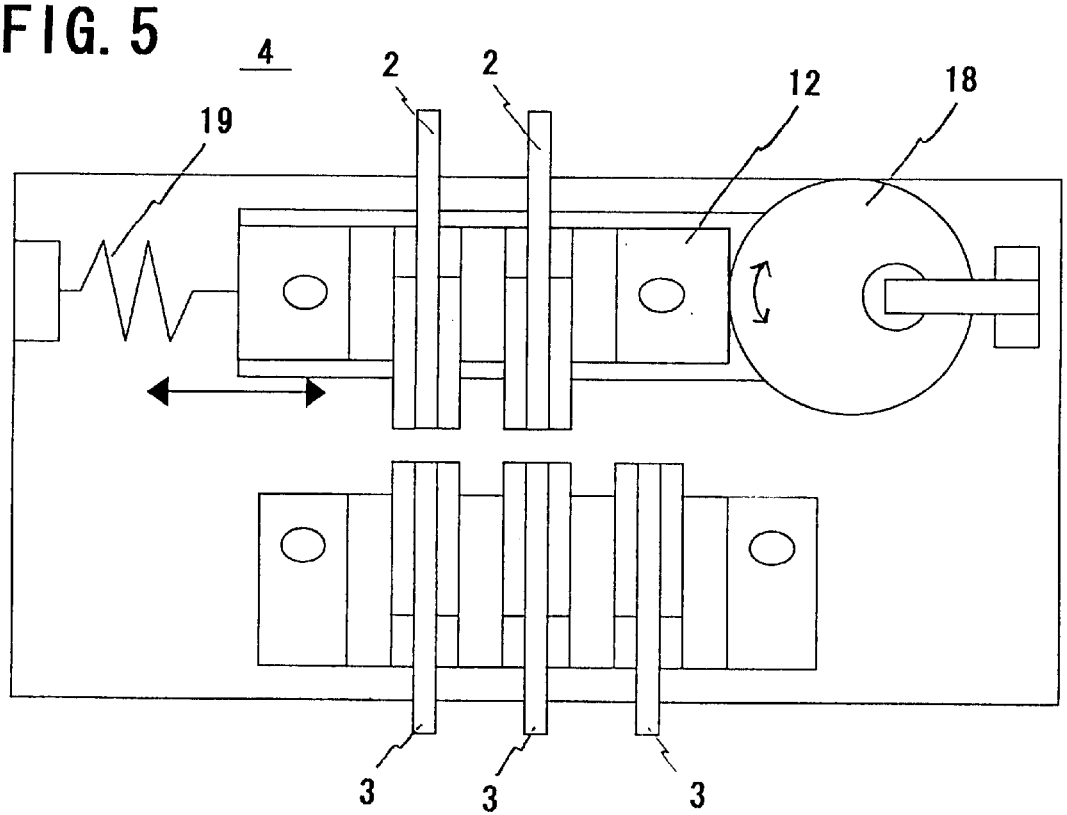
FIG. 5 is a schematic plane view of an optical communications equipment in accordance with a fourth embodiment of the present invention.

As shown in FIG. 5 that is a partially cutaway plane view, the present embodiment is similar to the optical switch 4 described previously, except that two parallel optical fibers 2 are arrayed in the optical switch 4 and that an ultrasonic motor 18 and a biasing spring 19 are used instead of the piezoelectric actuator 11.

The present embodiment yields advantages similar to those derived by the third embodiment.

In the third embodiment, the output can take N states (three states in the illustrated embodiment) for one input signal. That is, the optical switch is a so-called 1×N type optical switch that can be selected. In the present embodiment, two input signals can be switched simultaneously. Therefore, a so-called 2×N type optical switch can be accomplished.

Fifth Embodiment

Figure 6:
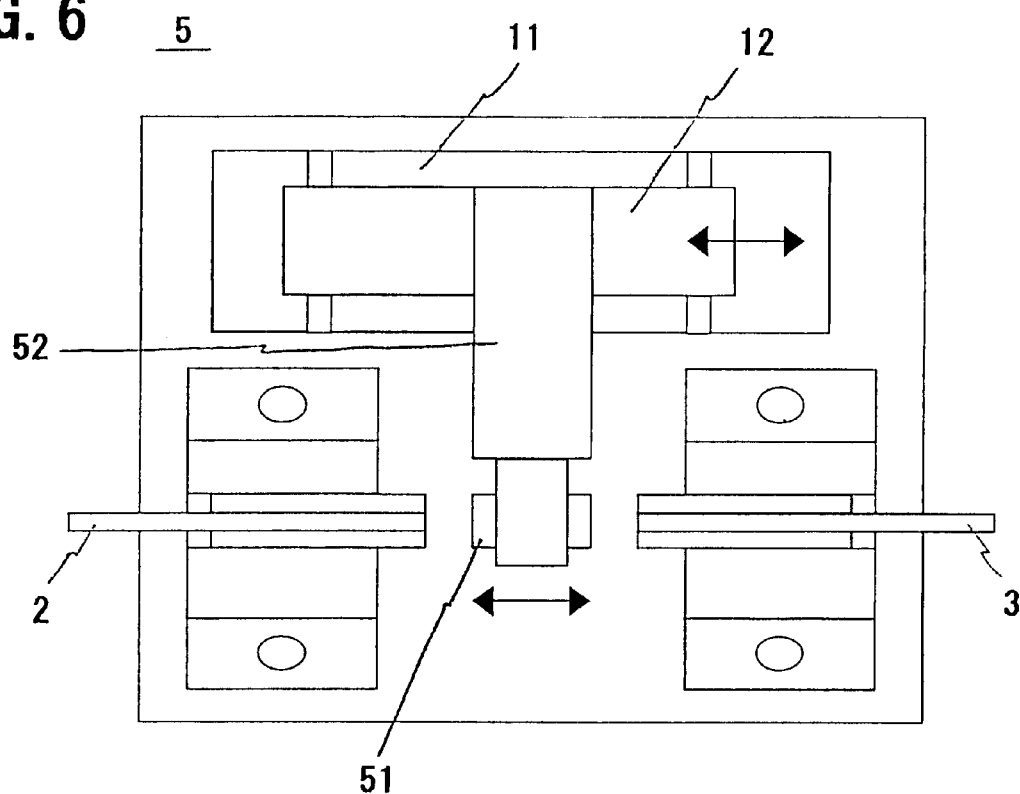
FIG. 6 is a schematic plane view of an optical communications equipment in accordance with a fifth embodiment of the present invention.

As shown in FIG. 6 that is a partially cutaway plane view, an optical attenuator (optical communications equipment) 5 in accordance with the present embodiment is similar to the optical switch 1 described previously, except that a lens 51 is mounted to the moving body 12 via a support member 52 instead of the multi-coating filter 13. The lens 51 is so positioned that it receives light exiting from the optical fiber 2 and that the direction of movement of the moving body 12 is parallel to the direction of departure of the light from the optical fiber 2.

In this optical attenuator 5, the control circuit 17 drives the piezoelectric actuator 11 to move the moving body 12 forward or rearward while recognizing the amount of attenuation of light from the output signal from the optical signal detecting circuit 14. In this way, the distance between the optical fiber 2 and the lens 51 is adjusted more minutely than heretofore. The amount of attenuation of light can be adjusted to a desired value more accurately than in the past.

Moreover, the optical fiber 2 can be driven by a latching mechanism similarly to the optical switch 1. If the optical fiber 2 is not moved for a long time, the piezoelectric actuator 11 can be driven reliably at all times.

Sixth Embodiment

Figure 7:
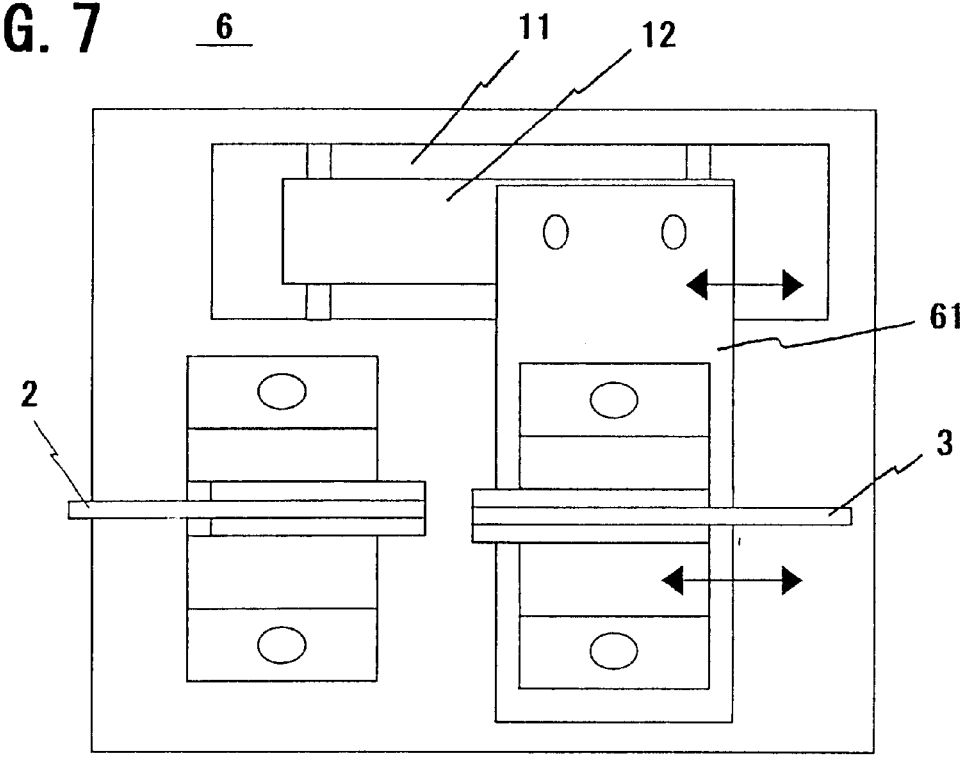
FIG. 7 is a schematic plane view of an optical communications equipment in accordance with a sixth embodiment of the present invention.

As shown in FIG. 7 that is a partially cutaway plane view, an optical attenuator (optical communications equipment) 6 in accordance with the present embodiment is similar in structure with the optical attenuator 5 described previously, except that an optical fiber 3 is mounted on the moving body 12 via a support member 61 instead of the lens 51. The direction of movement of the moving body 12 is the same as the direction of movement of the optical attenuator 5.

In the optical attenuator 6, the piezoelectric actuator 11 is driven to move the moving body 12 forward or rearward. Thus, the distance between the optical fiber 2 and the optical fiber 3 can be adjusted more accurately than heretofore. Accordingly, the amount of attenuation of light can be adjusted more accurately than in the past.

Furthermore, the optical fiber 2 can be driven by a latching mechanism similarly to the optical switch 1. In addition, if the optical fiber 2 is not moved for a long time, the piezoelectric actuator 11 can be driven reliably at all times.

Seventh Embodiment

Figure 8:
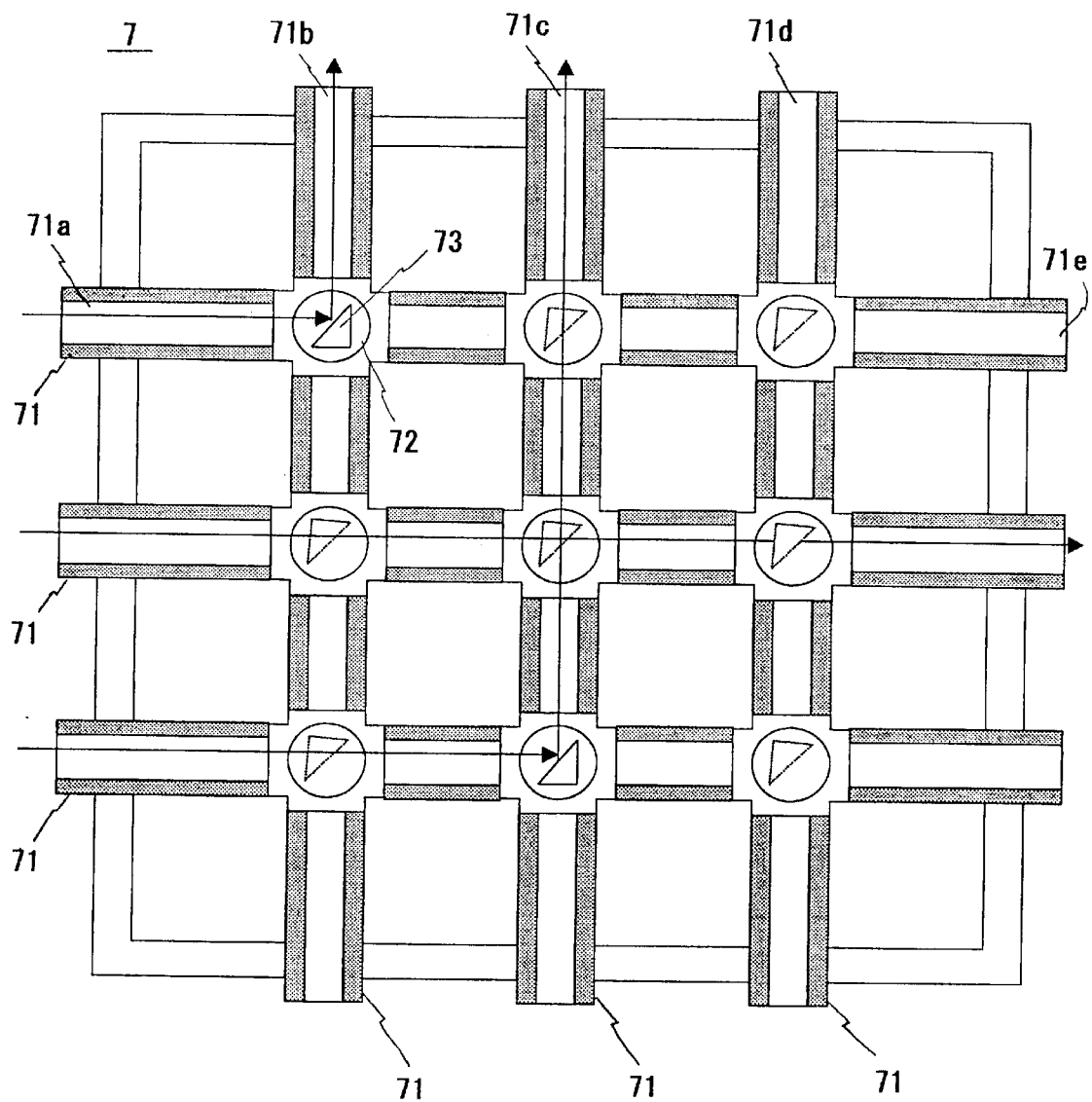
FIG. 8 is a schematic plane view of an optical communications equipment in accordance with a seventh embodiment of the present invention.

As shown in FIG. 8 that is a partially cutaway plane view, an optical switch 7 in accordance with the present embodiment is characterized in that optical fibers 71 are arranged in a matrix state in three rows and three columns so as to cross each other horizontally and vertically. Each optical fiber 71 is interrupted at each intersection. A reflecting plate 73 that is moved up and down while rotating by a well-known rotary ultrasonic motor 72 is placed at each interrupted portion. That is, the optical switch 7 has nine ultrasonic motors 72 and nine reflecting plates 73.

The optical switch 7 is provided with an optical signal detecting circuit 14, a moving body position detecting mechanism 15, a drive circuit 16, and a control circuit 17 in the same way as the optical switch 1 described previously.

A block diagram of the optical switch 7 is similar to FIG. 1, except that the ultrasonic motors 72 and reflecting plates 73 are arranged in parallel instead of the piezoelectric actuator 11 and the multi-coating filter 13 shown in FIG. 1.

In the optical switch 7, each ultrasonic motor 72 is controlled to move the reflecting plates 73 upward or downward such that any arbitrary one of the four optical fibers 71 (e.g., optical fibers 71b, 71c, 71d and 71e shown in FIG. 8) can be selected as an output optical fiber. The optical input signal applied from one optical fiber 71 (e.g., optical fiber 71a shown in FIG. 8) is obtained as an output signal from this output optical fiber.

Since the optical switch 7 uses the ultrasonic motors 72 as drive sources for the reflecting plates 73, the optical fibers 71 and the reflecting plates 73 can be integrated at a much increased density. If the device density increases further, an optical switch in the form of an N×N matrix optical switch can be realized while maintaining the practical size.

In the embodiments described thus far, the optical attenuator 5 uses the piezoelectric actuator 11. It is to be understood that the present invention is not limited to this structure. Instead, the optical attenuator 11 may use the ultrasonic motor 18 and the biasing spring 19.

The piezoelectric actuator may be of any type as long as it uses a bending motion or an expanding and contracting motion as a drive source. Obviously, appropriate modifications may be added to the structure and the functions of the optical control unit.

The present invention permits the optical control unit to be placed in position more accurately than heretofore. If the optical control unit (i.e., the moving body) is not moved, the piezoelectric actuator is forcedly driven by the function keeping signal at regular intervals to such an extent that the moving body is not driven or that the transmission of the optical signal is not affected. Hence, the reliability of the piezoelectric actuator can be maintained high at all times.

What is claimed is:

1. An optical communications equipment comprising:
   a piezoelectric actuator using a deformation motion produced in a piezoelectric vibrating body as a power source;
   a moving body moved by the piezoelectric actuator as a drive source;
   an optical control unit for controlling light that is a signal medium by movement of the moving body; and
   a drive control circuit for controlling the optical control unit via the piezoelectric actuator.

2. An optical communications equipment comprising:
   a piezoelectric actuator using a deformation motion produced in a piezoelectric vibrating body as a power source;
   a moving body driven by the piezoelectric actuator as a drive source;
   an optical control unit for controlling light that is a signal medium by movement of the moving body; and
   a drive control circuit for controlling the optical control unit via the piezoelectric actuator, the drive control circuit acting to send a function keeping signal to drive the piezoelectric actuator to such an extent that movement of the moving body is not affected if the moving body is not moved for a given time.

3. An optical communications equipment comprising:

a piezoelectric actuator using a deformation motion produced in a piezoelectric vibrating body as a power source;

a moving body driven by the piezoelectric actuator as a drive source;

an optical control unit for controlling light that is a signal medium by movement of the moving body; and a drive control circuit drives the piezoelectric actuator to such an extent that, if the moving body is not moved for a given time, sends a function keeping signal to forcedly move the moving body without affecting transmission of optical signal.

4. The optical communications equipment according to claim 1, further comprising an optical detection unit for detecting state of light controlled by the optical control unit, wherein the drive control circuit drives and controls the piezoelectric actuator using a value detected by the optical detection unit.

5. The optical communications equipment according to claim 3, further comprising an optical detection unit for detecting state of light controlled by the optical control unit, wherein the drive control circuit drives and controls the piezoelectric actuator using a value detected by the optical detection unit.

6. The optical communications equipment according to claims 1 to 5, further comprising a position detecting unit for detecting position of the moving body, wherein the drive control circuit drives and controls the piezoelectric actuator using a value detected by the position detecting unit.

7. The optical communications equipment according to claim 1, wherein the piezoelectric actuator is of a rotation type.

8. The optical communications equipment according to claim 1, where in the piezoelectric actuator is of a translational type.

9. The optical communications equipment according to claim 1, wherein a filter for turning on and off light is held to the moving body.

10. The optical communications equipment according to claim 1, wherein the moving body moves an optical fiber to turn on and off light.

11. The optical communications equipment according to claim 1, wherein a wavelength-variable filter is held to the moving body.

12. The optical communications equipment according to claim 1, wherein a lens for adjusting state of attenuation of light is held to the moving body.

13. The optical communications equipment according to claim 1, wherein a pair of optical fibers is held to the moving body such that distance between ends of the optical fibers is made variable to adjust state of attenuation of light.

* * * * *